United States Patent
Park et al.

(10) Patent No.: US 11,941,202 B2
(45) Date of Patent: Mar. 26, 2024

(54) INPUT SENSING UNIT AND DISPLAY DEVICE INCLUDING THE SAME

(71) Applicant: SAMSUNG DISPLAY CO., LTD., Yongin-si (KR)

(72) Inventors: Sang Hun Park, Yongin-si (KR); Yun A Ma, Yongin-si (KR); Mi Hee Son, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 16 days.

(21) Appl. No.: 17/746,059

(22) Filed: May 17, 2022

(65) Prior Publication Data
US 2023/0131983 A1 Apr. 27, 2023

(30) Foreign Application Priority Data
Oct. 26, 2021 (KR) .......... 10-2021-0143995

(51) Int. Cl.
| | |
|---|---|
| G06F 3/044 | (2006.01) |
| G06F 1/16 | (2006.01) |
| G06F 3/041 | (2006.01) |
| G09G 3/3233 | (2016.01) |

(52) U.S. Cl.
CPC ........ *G06F 3/04166* (2019.05); *G06F 1/1643* (2013.01); *G06F 3/044* (2013.01); *G06F 3/0443* (2019.05); *G09G 3/3233* (2013.01); *G09G 2354/00* (2013.01)

(58) Field of Classification Search
CPC .... G06F 3/04166; G06F 1/1643; G06F 3/044; G06F 3/0443; G09G 3/3233; G09G 2354/00
See application file for complete search history.

(56) References Cited

U.S. PATENT DOCUMENTS

| | | | | |
|---|---|---|---|---|
| 2021/0027704 | A1* | 1/2021 | Tong | ............ G09G 3/3233 |
| 2023/0072599 | A1* | 3/2023 | Nakanishi | ............ G06F 3/0443 |

FOREIGN PATENT DOCUMENTS

| | | |
|---|---|---|
| CN | 110162219 | 8/2019 |
| CN | 110989255 | 4/2020 |

\* cited by examiner

*Primary Examiner* — Julie Anne Watko
(74) *Attorney, Agent, or Firm* — F. Chau & Associates, LLC

(57) ABSTRACT

An input sensor includes sensing electrodes, and multiplexers for connecting sensing electrodes corresponding to one group of the sensing electrodes to one output terminal. Each of the multiplexers includes a multiplexer circuit including a plurality of switching transistors, and a shift register array for outputting selection signals for controlling the plurality of switching transistors. Each of the switching transistors includes sub-switching transistors connected in parallel between one of the sensing electrodes corresponding to the one group and the output terminal. The sub-switching transistors are sequentially turned on in response to one of the selection signals.

20 Claims, 10 Drawing Sheets

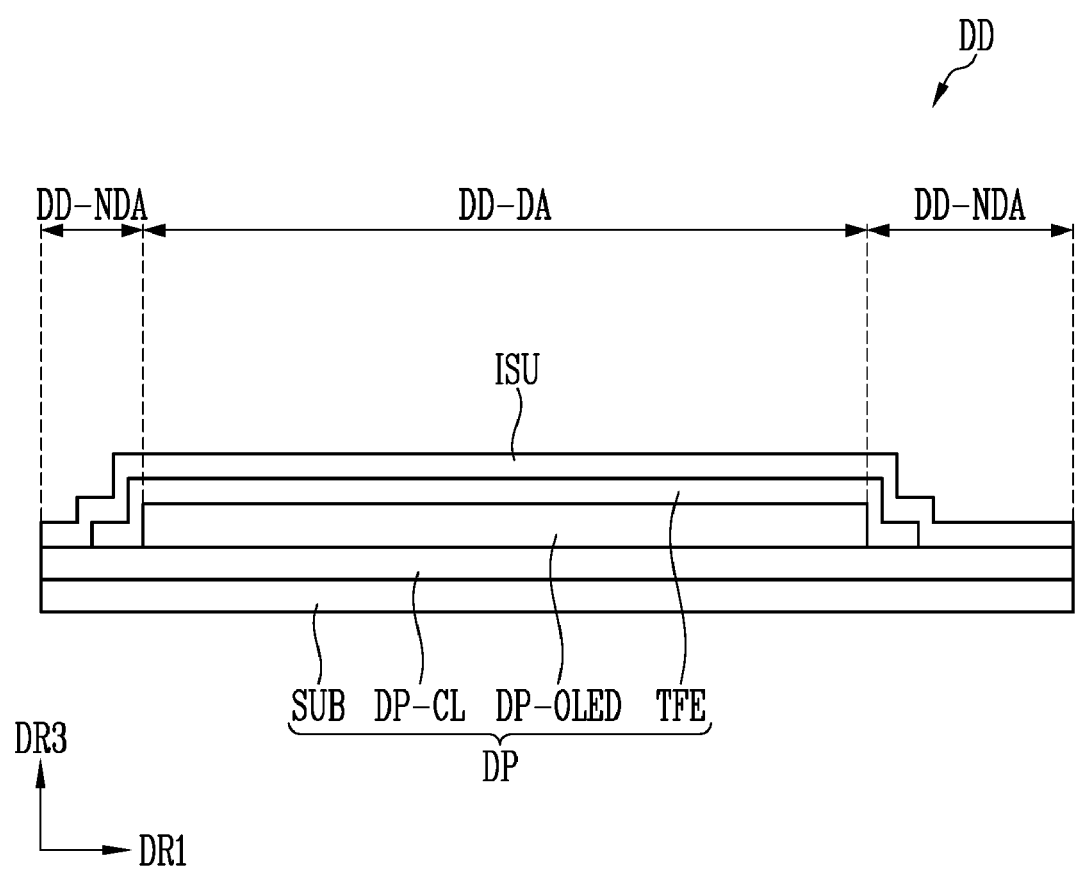

INPUT SENSING UNIT AND DISPLAY DEVICE INCLUDING THE SAME

CROSS-REFERENCE TO RELATED APPLICATION

This U.S. non-provisional patent application claims priority under 35 U.S.C. § 119 to Korean Patent Application No. 10-2021-0143995 filed in the Korean Intellectual Property Office on Oct. 26, 2021, the disclosure of which is incorporated by reference in its entirety herein.

1. TECHNICAL FIELD

The present invention relates to an input sensing unit and a display device including the same.

2. DISCUSSION OF RELATED ART

Electronic devices such as smart phones, digital cameras, notebook computers, navigation systems, and smart televisions, include display devices for displaying images. The display device includes a display panel that generates and displays an image, and various input devices.

A touch sensor for recognizing a touch input may be incorporated into the display device. The touch sensor may be used to replace an existing physical input device, such as a keypad.

The touch sensor may be a mutual-capacitance type touch sensor or a self-capacitance type touch sensor. The self-capacitance type touch sensor has less resistance-capacitance (RC) delay than the mutual-capacitance type touch sensor. However, since a plurality of touch electrodes arranged in rows and columns are separately driven, there may be significant spatial restrictions in designing signal lines and pads for driving the touch sensor, compared with the mutual-capacitance type touch sensor. In order to overcome this problem, a multiplexer is used to overcome the spatial restrictions.

When the display device is touch-driven, electromagnetic interference may occur. A component for controlling a slew rate of a touch sensing signal may be further included in a touch driver (or a touch IC) to reduce the electromagnetic interference. However, use of this additional component may increase the size and production cost of the touch driver (or the touch IC).

SUMMARY

An embodiment of the present invention may provide an input sensing unit capable of reducing electromagnetic interference during touch driving, and a display device including the same.

An embodiment of the present invention may provide an input sensing unit capable of reducing the size and production cost of a touch driver (or a touch IC), and a display device including the same.

According to an embodiment of the present invention, an input sensor includes sensing electrodes and multiplexers. Each of the multiplexers connects one group of the sensing electrodes to one output terminal. Each of the multiplexers includes a multiplexer circuit including a plurality of switching transistors, and a shift register array for outputting selection signals for controlling the plurality of switching transistors. Each of the switching transistors includes sub-switching transistors connected in parallel between one of the sensing electrodes corresponding to the one group and the output terminal. The sub-switching transistors are sequentially turned on in response to one of the selection signals.

Gate electrodes of the sub-switching transistors may be commonly connected to a wiring through which the one selection signal output from the shift register array is transmitted.

The wiring may include a resistor between the gate electrodes of the sub-switching transistors.

The wiring may include a bent portion having a zigzag shape between the gate electrodes of the sub-switching transistors.

The wiring may have a width greater than a reference width between the gate electrodes of the sub-switching transistors.

The reference width may correspond to the width of the wiring between the shift register array and the sub-switching transistor to which the one selection signal is first supplied.

The input sensor may further include a touch driver including a power supply for supplying a charging signal or an initialization signal to the sensing electrodes and a first switch for connecting the power supply to the output terminal, and an input sensing circuit including a touch receiver having a second switch connected to the output terminal and receiving a sensing signal from the sensing electrodes.

The input sensing circuit may be connected to each of the multiplexers through a sensing pad.

The power supply may include a third switch disposed between the first switch and a terminal for supplying the charging signal, and a fourth switch disposed between the first switch and a terminal for supplying the initialization signal.

The input sensing circuit may be configured so that, during a first period in which the charging signal is supplied to the sensing electrodes, the first switch and the third switch are turned on and the second switch and the fourth switch are turned off.

The input sensing circuit may be configured so that, during a second period in which the sensing signal is received from the sensing electrodes, the second switch is turned on and the first switch is turned off.

The input sensing circuit may be configured so that, during a third period in which the initialization signal is supplied to the sensing electrodes, the first switch and the fourth switch are turned on and the second switch and the third switch are turned off.

The touch receiver may include: a touch channel, connected to one end of the second switch, for receiving the sensing signal and outputting an output signal having an analog voltage level to a second output terminal; an analog-to-digital converter, connected to the second output terminal, for converting the output signal into a digital value and outputting the digital value; and a processor, connected to the analog-to-digital converter, for determining a touch input by using the digital value.

The touch channel may include: an amplifier including a first input terminal connected to the second switch, a second input terminal for receiving a reference voltage, and the second output terminal; a sensing capacitor connected between the first input terminal and the second output terminal; and a reset switch connected between the first input terminal and the second output terminal.

The reset switch may be turned on while the initialization signal is supplied to the sensing electrodes.

According to an embodiment of the present invention, a display device includes: a display panel in which a base layer, a circuit element layer, a display element layer, and a thin film encapsulation layer (TFE) are sequentially stacked; and an input sensor disposed on the thin film encapsulation layer.

The input sensor may include sensing electrodes and multiplexers. Each of the multiplexers connect to one group of the sensing electrodes to one output terminal. Each of the multiplexers include a multiplexer circuit including a plurality of switching transistors, and a shift register array for outputting selection signals for controlling the plurality of switching transistors. Each of the switching transistors include sub-switching transistors connected in parallel between one of the sensing electrodes corresponding to the one group and the output terminal, and the sub-switching transistors are sequentially turned on in response to one of the selection signals.

Gate electrodes of the sub-switching transistors may be commonly connected to a wiring through which the one selection signal output from the shift register array is transmitted.

The wiring may include a resistor between the gate electrodes of the sub-switching transistors.

The wiring may include a bent portion having a zigzag shape between the gate electrodes of the sub-switching transistors.

The wiring may have a width greater than a reference width between the gate electrodes of the sub-switching transistors.

The reference width may correspond to the width of the wiring between the shift register array and the sub-switching transistor to which the one selection signal is first supplied.

According to an embodiment of the present invention, a touch sensor includes a plurality of sensing electrodes for sensing a touch, a multiplexer circuit connecting a group of the sensing electrodes to an output terminal, and a shift register. The multiplexer circuit includes a plurality of switching transistors, where each switching transistor is connected to a different one of the sensing electrodes of the group and includes a plurality of sub-switching transistors connected in parallel between one of the sensing electrodes of the group and the output terminal. The shift register provides a selection signal to gates of the sub-switching transistors.

The touch sensor may further include a resistor connected between each pair of the gates. The resistor may includes at least one bent wire. The resistor may have a width greater than a wiring between the shift register and the sub-switching transistor to which the selection signal is first supplied.

BRIEF DESCRIPTION OF THE DRAWINGS

FIG. 2 is a cross-sectional view of a display device according to an embodiment of the present invention.

DETAILED DESCRIPTION OF THE EMBODIMENTS

Figure 1:
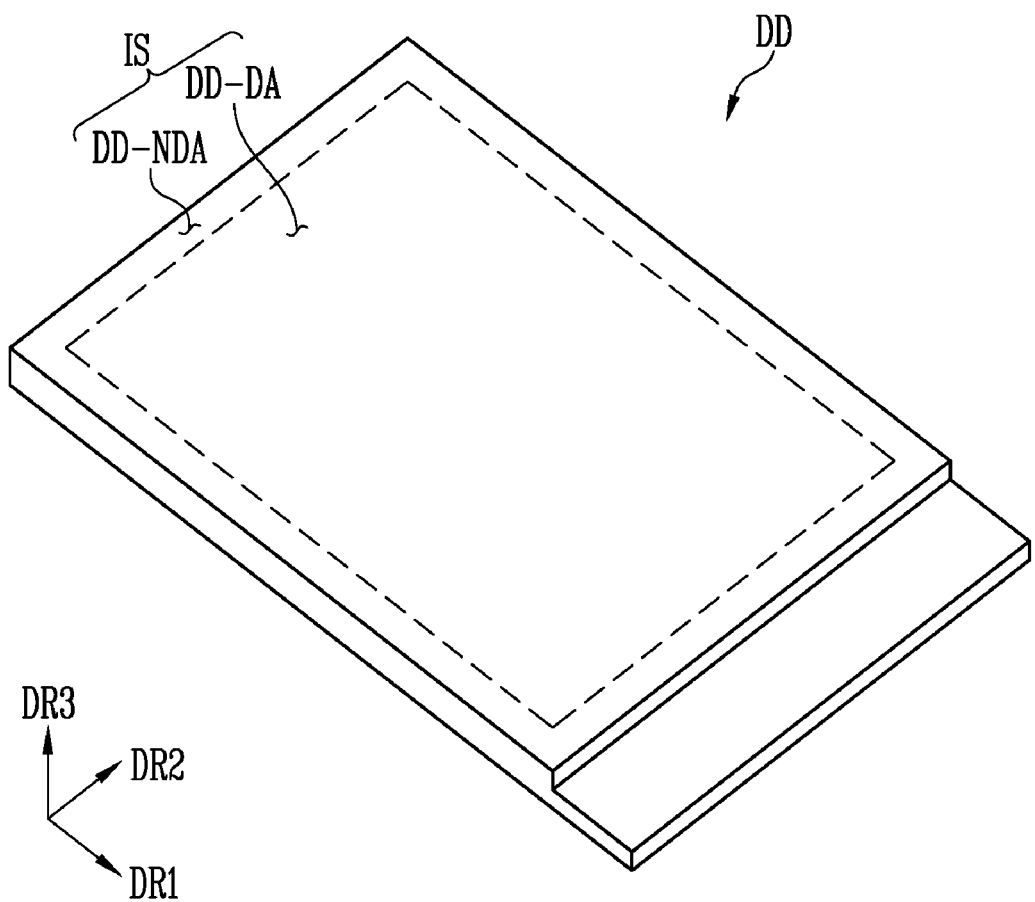
FIG. 1 is a perspective view of a display device according to an embodiment of the present invention.

Features of the present invention, and methods of achieving them will be clarified with reference to embodiments described below in detail with reference to the accompanying drawings. However, the present invention is not limited to the embodiments disclosed below, but may be implemented in various different forms. The embodiments are only provided so that the disclosure of the present invention is complete and are provided to fully inform those of ordinary skill in the art to which the present invention belongs, the scope of the invention.

It will be understood that, when an element or a layer is referred to as being "on" another element or layer, it may be directly or indirectly on the other element or layer. That is, for example, intervening elements or layers may be present therebetween.

It will be understood that although the terms "first," "second," "third," "fourth," etc. may be used herein to describe various elements, these elements should not be limited by these terms. These terms are only used to distinguish one element from another. Therefore, it will be understood that a first element as used herein may be one of a second element, a third element, and a fourth element within the technical spirit of the present invention.

The embodiments described herein will be described with reference to plan views and cross-sectional views, which may be ideal schematic views of the present invention. Therefore, the shapes of the exemplary drawings may be modified due to manufacturing technology and/or tolerance. Therefore, the embodiments of the present invention are not limited to the illustrated specific forms, and may include changes in the forms generated according to the manufacturing process. Accordingly, the regions illustrated in the drawings have schematic properties, and the shapes of the regions illustrated in the drawings are intended to illustrate specific shapes of regions of the device and not to limit the scope of the invention.

Hereinafter, the embodiments will be described with reference to the accompanying drawings.

FIG. 1 is a perspective view of a display device according to an embodiment of the present invention.

Referring to FIG. 1, a display device DD may display an image through a display surface IS. The display surface IS may be parallel to a surface defined by a first direction DR1 and a second direction DR2. A third direction DR3 indicates a normal direction of the display surface IS, that is, a thickness direction of the display device DD.

A front surface (or upper surface) and a rear surface (or lower surface) of each member or unit described below may be defined in the third direction DR3. However, the present embodiment, the first to third directions DR1, DR2, and the directions indicated by the first to third directions DR1, DR2, and DR3 may be converted into other directions as a relative concept. Hereinafter, the first to third directions are denoted by the same reference numerals as directions indicated by the first to third directions DR1, DR2, and DR3, respectively.

Although the display device DD having a planar display surface is illustrated in an embodiment, the present invention is not limited thereto. The display device DD may include a curved display surface or a three-dimensional display surface. The three-dimensional display surface includes a plurality of display areas indicating different directions, and may include, for example, a polygonal columnar display surface.

The display device DD according to the present embodiment may be a rigid display device. However, the present invention is not limited thereto, and the display device DD according to the present invention may be a flexible display device DD. In the present embodiment, the display device DD applicable to a mobile phone terminal is illustrated as an example. Although not illustrated, electronic modules, camera modules, power modules, etc. mounted on a main board are disposed on a bracket/case together with the display device DD, thereby constituting a mobile phone terminal. The display device DD according to the present invention may be applied to large-sized electronic devices such as televisions and monitors, and small- and medium-sized electronic devices such as tablets, car navigation systems, game consoles, and smart watches.

Referring to FIG. 1, the display surface IS may include a display area DD-DA on which an image is displayed and a non-display area DD-NDA adjacent to the display area DD-DA. The non-display area DD-NDA is an area on which an image is not displayed.

Referring to FIG. 1, the display area DD-DA may have a rectangular shape. The non-display area DD-NDA may have a shape surrounding the display area DD-DA. However, the present invention is not limited thereto, and the shape of the display area DD-DA and the shape of the non-display area DD-NDA may be designed different from that illustrated.

FIG. 2 is a cross-sectional view of the display device DD of FIG. 1 according to an embodiment of the present invention.

Referring to FIG. 2, the display device DD may include a display panel DP and an input sensing unit ISU (e.g., an input or touch sensor). Although not illustrated separately, the display device DD according to an embodiment of the present invention may further include a protection member disposed on the lower surface of the display panel DP, and an anti-reflection member and/or a window member disposed on the upper surface of the input sensing unit ISU.

The display panel DP may be a light emitting display panel, but is not particularly limited. For example, the display panel DP may be an organic light emitting display panel or a quantum dot light emitting display panel. In the organic light emitting display panel, an emission layer includes an organic light emitting material. In the quantum dot light emitting display panel, the emission layer includes quantum dots and quantum rods. Hereinafter, it is assumed that the display panel DP is an organic light emitting display panel.

The display panel DP may include a base layer SUB (e.g., a substrate), and a circuit element layer DP-CL, a display element layer DP-OLED, and a thin film encapsulation layer TFE, which are disposed on the base layer SUB. Although not illustrated separately, the display panel DP may further include functional layers such as an anti-reflection layer and a refractive index control layer.

The base layer SUB may include at least one plastic film. The base layer SUB is a flexible substrate and may include a plastic substrate, a glass substrate, a metal substrate, or an organic/inorganic composite substrate. The display area DD-DA and the non-display area DD-NDA described with reference to FIG. 1 may be equally defined in the base layer SUB.

The circuit element layer DP-CL may include at least one intermediate insulating layer and a circuit element. The intermediate insulating layer may include at least one intermediate inorganic layer and at least one intermediate organic layer. The circuit element may include signal lines, a pixel driving circuit, and the like.

Figure 3A:
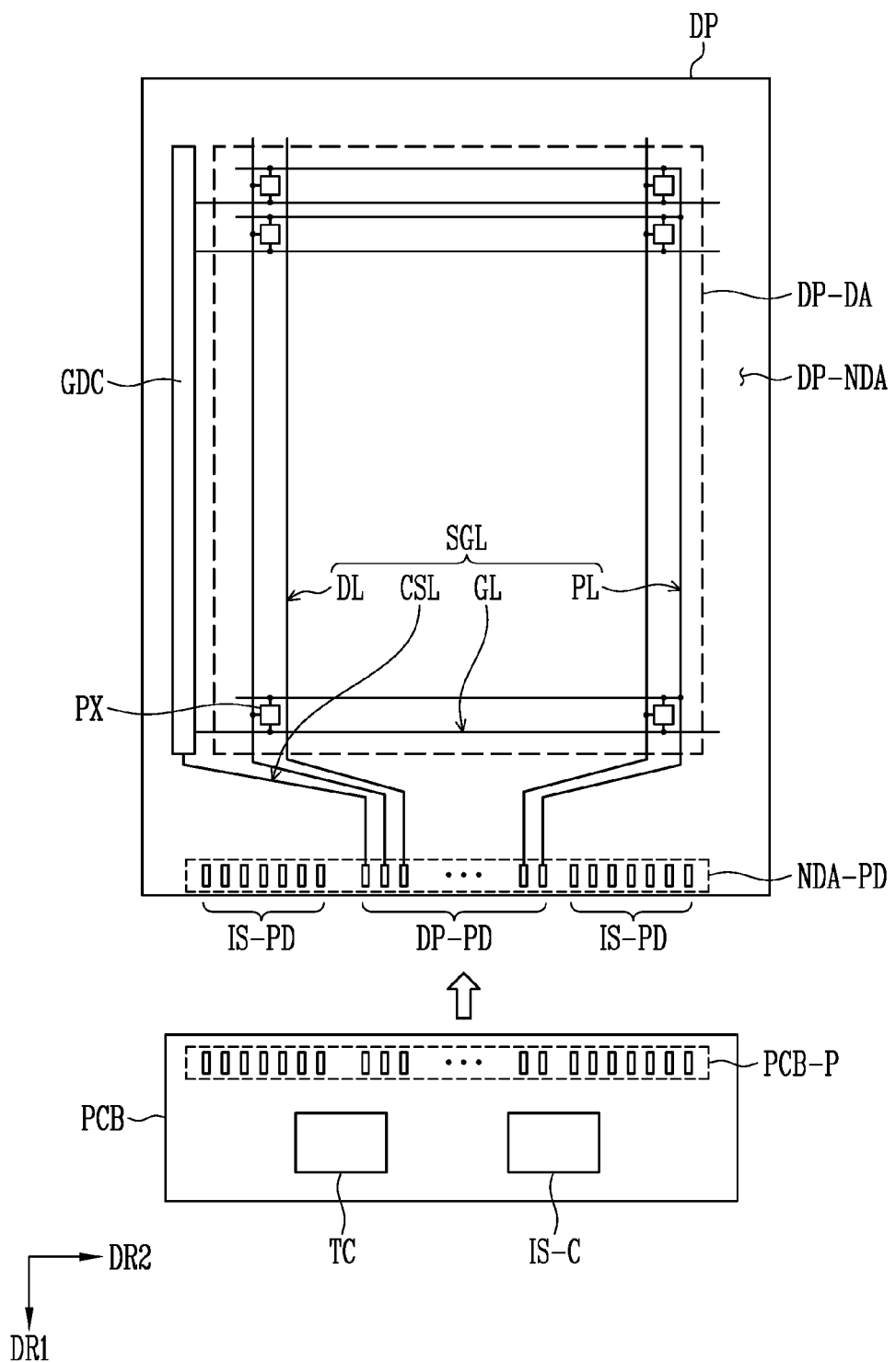
FIG. 3A is a plan view of a display panel according to an embodiment of the present invention.
Figure 3B:
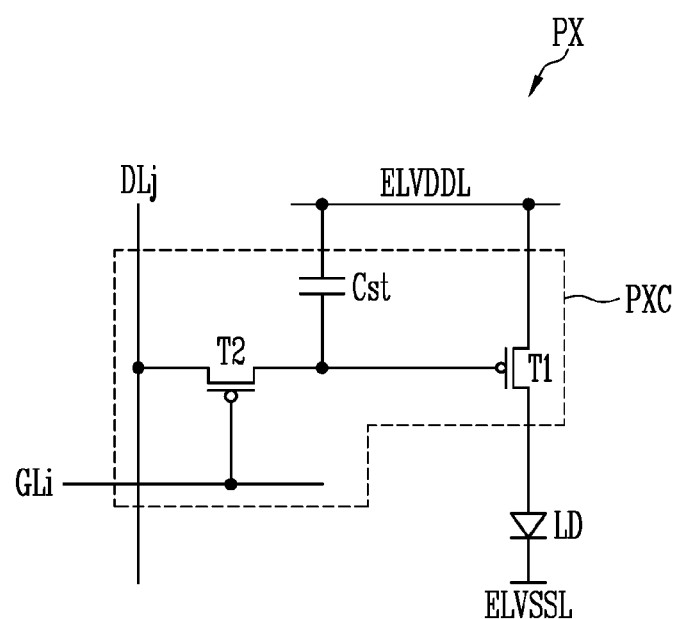
FIG. 3B is a diagram for describing a pixel according to an embodiment of the present invention.

The display element layer DP-OLED may include at least one light emitting element (LD of FIG. 3B). The display element layer DP-OLED may further include an organic layer such as a pixel defining layer.

The thin film encapsulation layer TFE may encapsulate the display element layer DP-OLED. The thin film encapsulation layer TFE may include at least one inorganic layer (hereinafter, an encapsulation inorganic layer). The thin film encapsulation layer TFE may further include at least one organic layer (hereinafter, an encapsulation organic layer). The encapsulation inorganic layer may protect the display element layer DP-OLED from moisture/oxygen, and the encapsulation organic layer may protect the display element layer DP-OLED from foreign material such as dust particles. The encapsulation inorganic layer may include a silicon nitride layer, a silicon oxynitride layer, a silicon oxide layer, a titanium oxide layer, or an aluminum oxide layer. The encapsulation organic layer may include an acryl-based organic layer, but is not limited thereto.

The input sensing unit ISU may obtain coordinate information of an external input (e.g., a touch). The input sensing unit ISU may be formed on the display panel DP by a continuous process, or at least some components may be connected to each other through an adhesive member.

The input sensing unit ISU may have a multilayer structure. The input sensing unit ISU may include a single-layer or multilayer conductive layer. The input sensing unit ISU may include a single-layer or multilayer insulating layer.

The input sensing unit ISU may sense an external input, for example, in a self-capacitance manner.

FIG. 3A is a plan view of the display panel DP of FIG. 2 according to an embodiment of the present invention. FIG. 3B is a diagram for describing a pixel of the display panel DP according to an embodiment of the present invention.

Referring to FIG. 3A, the display panel DP may include a display area DP-DA and a non-display area DP-NDA in a plan view. In the present embodiment, the non-display area DP-NDA may be defined along the edge of the display area DP-DA. The display area DP-DA and the non-display area DP-NDA of the display panel DP may correspond to the display area DD-DA and the non-display area DD-NDA of the display device DD illustrated in FIGS. 1 and 2, respectively.

The display panel DP may include a driving circuit GDC, a plurality of display signal lines SGL, a plurality of signal pads DP-PD, and a plurality of pixels PX. The pixels PX may be disposed in the display area DP-DA. Each of the pixels PX may include a light emitting element (LD of FIG. 3B) and a pixel driving circuit (PXC of FIG. 3B). The driving circuit GDC, the display signal lines SGL, the signal pads DP-PD, and the pixel driving circuit (PXC of FIG. 3B) may be included in the circuit element layer DP-CL illustrated in FIG. 2.

The driving circuit GDC may include a scan driving circuit. The scan driving circuit may generate a plurality of scan signals (hereinafter, scan signals) and sequentially output the scan signals to the plurality of scan lines GL. The scan driving circuit may further output another control signal to the driving circuit of the pixels PX.

The driving circuit GDC may include a plurality of thin film transistors formed through the same process as the driving circuit of the pixels PX, for example, a low temperature polycrystalline silicon (LTPS) process or a low temperature polycrystalline oxide (LTPO) process.

The display signal lines SGL may include scan lines GL, data lines DL, a power line PL, and a control signal line CSL. The scan lines GL may be connected to the corresponding pixels PX among the pixels PX, and the data lines DL may be connected to the corresponding pixels PX among the pixels PX. The power line PL may be connected to the pixels PX. The control signal line CSL may provide control signals to the driving circuit GDC.

The display signal lines SGL may overlap the display area DP-DA and the non-display area DP-NDA. The display signal lines SGL may include a pad part and a line part. The line part may overlap the display area DP-DA and the non-display area DP-NDA. The pad part may be connected to an end of the line part. The pad part may be disposed in the non-display area DP-NDA, and may overlap a corresponding signal pad among the signal pads DP-PD. An area in which the signal pads DP-PD are disposed in the non-display area DP-NDA may be defined as a pad area NDA-PD.

The line part substantially connected to the pixel PX may constitute most of the display signal lines SGL. The line part may be connected to transistors (not illustrated) of the pixel PX. The line part may have a single-layer or multilayer structure, and the line part may have a single body or include two or more portions. The two or more portions may be disposed on different layers, and may be connected to each other through contact holes passing through an insulating layer disposed between the two or more portions.

The display panel DP may further include input sensing pads IS-PD disposed in the pad area NDA-PD. When the input sensing pads IS-PD are formed through the same process as the display signal lines SGL, the input sensing pads IS-PD may be disposed on the same layer as the display signal lines SGL.

The input sensing pads IS-PD may overlap pad parts of signal lines included in the input sensing unit ISU illustrated in FIG. 2. The input sensing pads IS-PD may be electrically insulated from the display signal lines SGL of the display panel DP.

FIG. 3A further illustrates a circuit board PCB electrically connected to the display panel DP. The circuit board PCB may be a rigid circuit board or a flexible circuit board. The circuit board PCB may be directly connected to the display panel DP, or may be connected to the display panel DP through another circuit board.

A timing control circuit TC for controlling the operation of the display panel DP may be disposed on the circuit board PCB. Also, an input sensing circuit IS-C for controlling the input sensing unit ISU may be disposed on the circuit board PCB. Each of the timing control circuit TC and the input sensing circuit IS-C may be mounted on the circuit board PCB in the form of an integrated chip. In an embodiment of the present invention, the timing control circuit TC and the input sensing circuit IS-C may be mounted on the circuit board PCB in the form of a single integrated chip. The circuit board PCB may include circuit board pads PCB-P electrically connected to the display panel DP. Although not illustrated, the circuit board PCB may further include signal lines connecting the circuit board pads PCB-P and the timing control circuit TC and/or the input sensing circuit IS-C.

In an embodiment of the present invention, the control signal line CSL and the power line PL may also be connected to the timing control circuit TC.

Referring to FIG. 3B, an example of the pixel PX is illustrated. In this case, for convenience of description, a pixel PX disposed in an i-th pixel row and a j-th pixel column will be described as an example.

The pixel PX may include a pixel driving circuit PXC and a light emitting element LD. The pixel driving circuit PXC may include a first transistor T1, a second transistor T2, and a storage capacitor Cst. However, this is only an example, and the pixel driving circuit PXC may be implemented in various forms by further including additional transistors and capacitors.

The first transistor T1 may have a gate electrode connected to a second electrode of the storage capacitor Cst, a first electrode connected to a first power line ELVDDL, and a second electrode connected to an anode of the light emitting element LD. The first transistor T1 may be referred to as a driving transistor.

The second transistor T2 may have a gate electrode connected to an i-th scan line GLi, a first electrode connected to a j-th data line DLj, and a second electrode connected to the second electrode of the storage capacitor Cst. The second transistor T2 may be referred to as a scan transistor. The storage capacitor Cst may have a first electrode connected to the first power line ELVDDL, and the second electrode connected to the gate electrode of the first transistor T1.

The light emitting element LD may have its anode connected to the second electrode of the first transistor T1 and a cathode connected to the second power line ELVSSL. During the emission period of the light emitting element LD, a first power supply voltage applied to the first power line ELVDDL may be greater than a second power supply voltage applied to the second power line ELVSSL. According to an embodiment, the light emitting elements of the pixels may have a common cathode. In this case, the cathode may be formed in a wide plate shape to cover the display area DP-DA.

The light emitting element LD may include an organic light emitting diode, an inorganic light emitting diode, a quantum dot/well light emitting diode, or the like. In addition, the light emitting element LD may include a plurality of light emitting elements connected in series, parallel, or series-parallel.

The transistors T1 and T2 are illustrated as P-type transistors, but when the polarity of an input signal is inverted, at least one of the P-type transistors may be replaced with an N-type transistor.

When a scan signal of a turn-on level is applied to the i-th scan line GLi, the second transistor T2 may be turned on. In this case, a data voltage charged in the j-th data line DLj may be stored in the storage capacitor Cst. The first transistor T1 may allow a driving current to flow according to a gate-source voltage difference maintained by the storage capacitor Cst. The driving current may flow through a path of the first power line ELVDDL, the first transistor T1, the light emitting element LD, and the second power line ELVSSL. The light emitting element LD may emit light with a luminance corresponding to an amount of the driving current.

Figure 4:
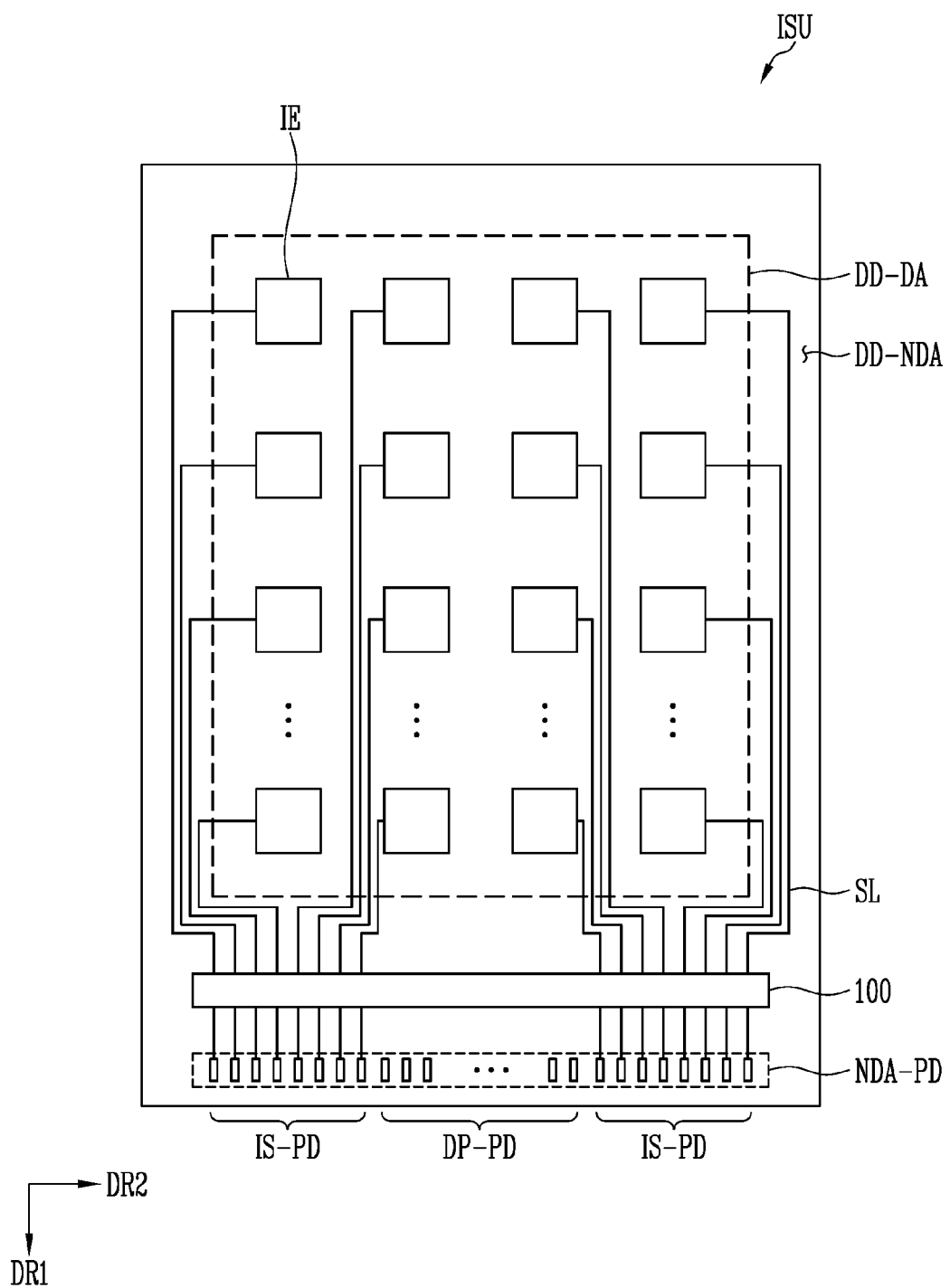
FIG. 4 is a plan view of an input sensing unit according to an embodiment of the present invention.

FIG. 4 is a plan view of an input sensing unit according to an embodiment of the present invention.

Referring to FIG. 4, the input sensing unit ISU may include a plurality of sensing electrodes IE and a plurality of signal lines SL. The sensing electrodes IE have unique coordinate information. For example, the sensing electrodes IE may be arranged in a matrix form and may be respectively connected to the signal lines SL. The shape and arrangement of the sensing electrodes IE are not particularly limited. The sensing electrodes IE may be disposed in the display area DD-DA. Some signal lines SL may be disposed in the display area DD-DA, and some signal lines SL may be disposed in the non-display area DD-NDA. The input sensing unit ISU according to the present embodiment may obtain coordinate information in a self-capacitance method.

Although the rectangular sensing electrodes IE are exemplarily illustrated in FIG. 4, the present invention is not limited thereto. In an embodiment, the sensing electrodes IE may have a polygonal shape.

The sensing electrodes IE may include a conductive material. For example, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), and platinum (Pt).

On the other hand, the sensing electrodes IE may include a transparent conductive material. Examples of the transparent conductive material may include silver nanowires (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotubes, and graphene. The sensing electrodes IE may include a single layer or multiple layers.

A switching circuit 100 may be disposed in the non-display area DD-NDA. The switching circuit 100 may electrically connect the input sensing pads IS-PD to the signal lines SL.

In an embodiment, the number of input sensing pads IS-PD is greater than or equal to the number of signal lines SL. In the present embodiment, since the switching circuit 100 is included, the input sensing unit ISU includes input sensing pads IS-PD, the number of which is less than the number of signal lines SL.

Figure 5:
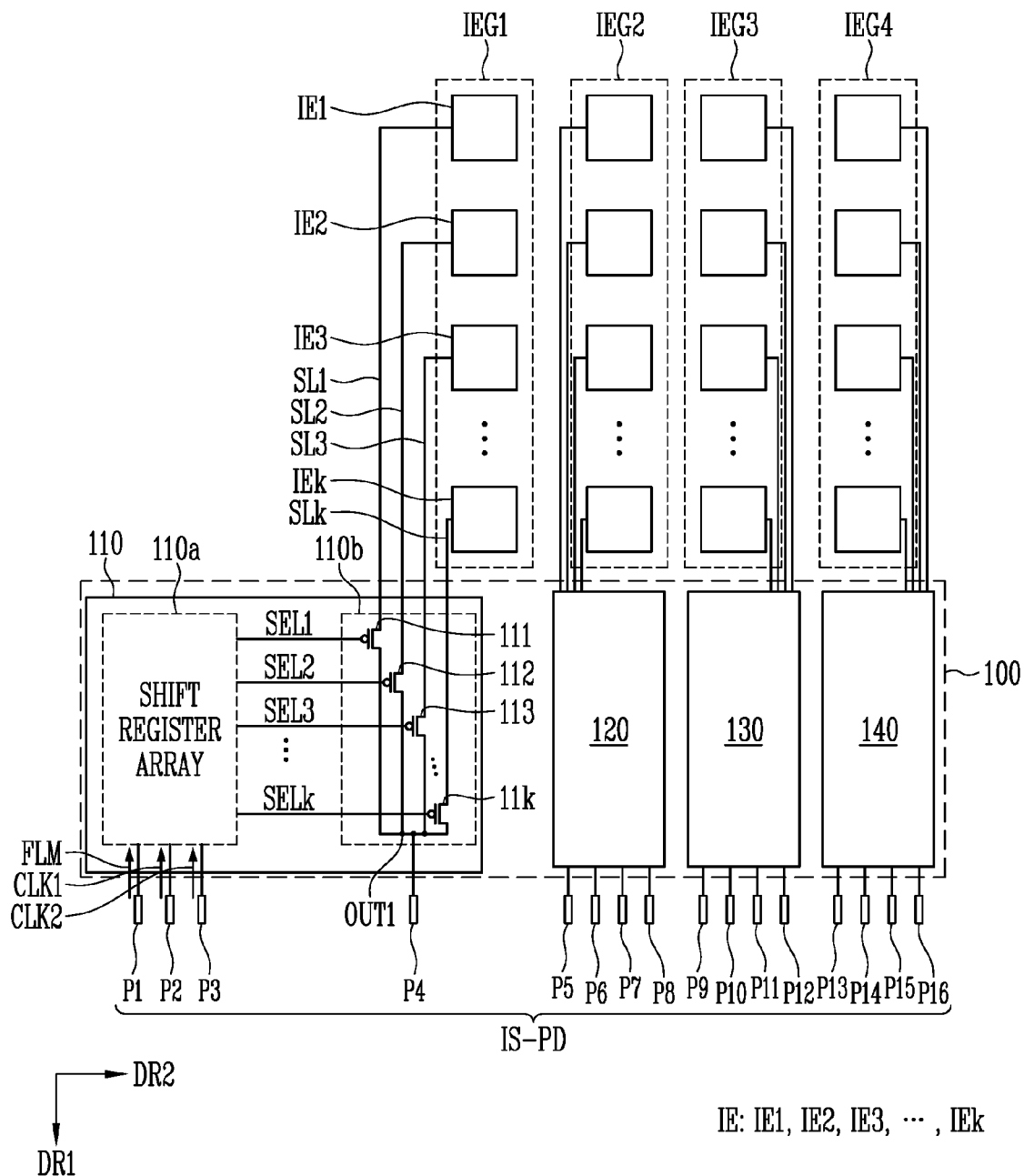
FIG. 5 is a circuit diagram of a switching circuit of an input sensing unit according to an embodiment of the present invention.

FIG. 5 is a circuit diagram of a switching circuit of an input sensing unit according to an embodiment of the present invention.

Referring to FIG. 5, the switching circuit 100 may include a plurality of multiplexers 110, 120, 130, and 140. In addition, the input sensing pads IS-PD may include control signal pads P1, P2, P3, P5, P6, P7, P9, P10, P11, P13, P14, and P15 and sensing pads P4, P8, P12, and P16. At this time, the configurations of the multiplexers 110, 120, 130, and 140 is substantially identical to each other, and the following description will be made based on the first multiplexer 110. The circuit configuration and operation of the second to fourth multiplexers 120, 130, and 140 are similar to those of the first multiplexer 110, and thus redundant descriptions thereof will be omitted.

The first multiplexer 110 may include a shift register array 110a (e.g., a shift register) and a multiplexer circuit 110b. The first multiplexer 110 may be connected to the control signal pads P1, P2, and P3 and the sensing pad P4.

The shift register array 110a may receive a start signal FLM and at least one clock signal from the control signal pad P1. In an embodiment, the shift register array 110a receives a first clock signal CLK1 from the control signal pad P2 and a second clock signal CLK2 from the control signal pad P3.

The shift register array 110a may output a plurality of selection signals SEL1 to SELk (where k is a positive integer greater than or equal to 2). In an embodiment, the shift register array 110a may sequentially activate the selection signals SEL1 to SELk to a first level (e.g., a low level). The multiplexer circuit 110b may selectively connect the plurality of signal lines SL1 to SLk to the output terminal OUT1 (or the sensing pad P4) in response to the plurality of selection signals SEL1 to SELk. For example, the first signal line SL1 may be connected to the output terminal OUT1 at a first time when the first selection signal SEL1 is set to the first level at the first time, the second signal line SL2 may be connected to the output terminal OUT1 at a second time after the first time when the second selection signal SEL2 is set to the first level at the second time, etc.

The sensing electrodes IE may be divided into a plurality of groups. In an embodiment, sensing electrodes arranged adjacent to each other in the first direction DR1 among the sensing electrodes IE may be classified into one sensing electrode group. For example, each sensing electrode group may include a column of sensing electrodes IE. In this embodiment, since the sensing electrodes IE are arranged by four in the second direction DR2, the sensing electrodes IE are divided into four sensing electrode groups IEG1 to IEG4, but the present invention is not limited thereto. That is, the number of sensing electrodes IE arranged in the second direction DR2 and the number of sensing electrode groups may be variously changed. In addition, the number of sensing electrodes included in the sensing electrode group may be variously changed.

The multiplexers 110, 120, 130, and 140 respectively correspond to the sensing electrode groups IEG1 to IEG4. The multiplexers 110, 120, 130, and 140 may electrically connect the output terminal and the signal line connected to one of the plurality of sensing electrodes in a corresponding sensing electrode group among the sensing electrode groups IEG1 to IEG4 in response to the selection signals SEL1 to SELk.

The multiplexer circuit 110b may electrically connect the output terminal OUT1 (or the sensing pad P4) and one of the signal lines SL1 to SLk connected to the sensing electrodes IE1 to IEk in the sensing electrode group IEG1 in response to the selection signals SEL1 to SELk.

The first multiplexer 110 may include a plurality of switching transistors 111 to 11k. The switching transistor 111 may include a first electrode connected to the signal line SL1 connected to the corresponding sensing electrode IE1, a second electrode connected to the output terminal OUT1, and a gate electrode receiving the first selection signal SEL1.

The switching transistor 112 may include a first electrode connected to the signal line SL2 connected to the corresponding sensing electrode IE2, a second electrode connected to the output terminal OUT1, and a gate electrode receiving the first selection signal SEL2.

The switching transistor 113 may include a first electrode connected to the signal line SL3 connected to the corresponding sensing electrode IE3, a second electrode connected to the output terminal OUT1, and a gate electrode receiving the first selection signal SEL3.

The switching transistor 11k may include a first electrode connected to the signal line SLk connected to the corresponding sensing electrode IEk, a second electrode connected to the output terminal OUT1, and a gate electrode receiving the first selection signal SELk.

In this embodiment, the switching transistors 111 to 11k include PMOS transistors, but are not limited thereto. In another embodiment, the switching transistors 111 to 11k may include NMOS transistors. When the switching transistors 111 to 11k include PMOS transistors, the activation period of the selection signals SEL1 to SELk may be a low level, and when the switching transistors 111 to 11k include NMOS transistors, the activation period of the selection signals SEL1 to SELk may be at a high level.

In FIG. 5, for convenience of description, only one of each of the switching transistors 111, 112, 113, . . . 11k is illustrated. However, in order to control the slew rate of the signal transmitted when the switching transistors 111, 112, 113, . . . 11k are turned on/off, each of the switching transistors 111, 112, 113, . . . 11k may be configured so that a plurality of sub-switching transistors are connected in parallel. This will be described in detail later with reference to FIGS. 6 to 8B.

Figure 6:
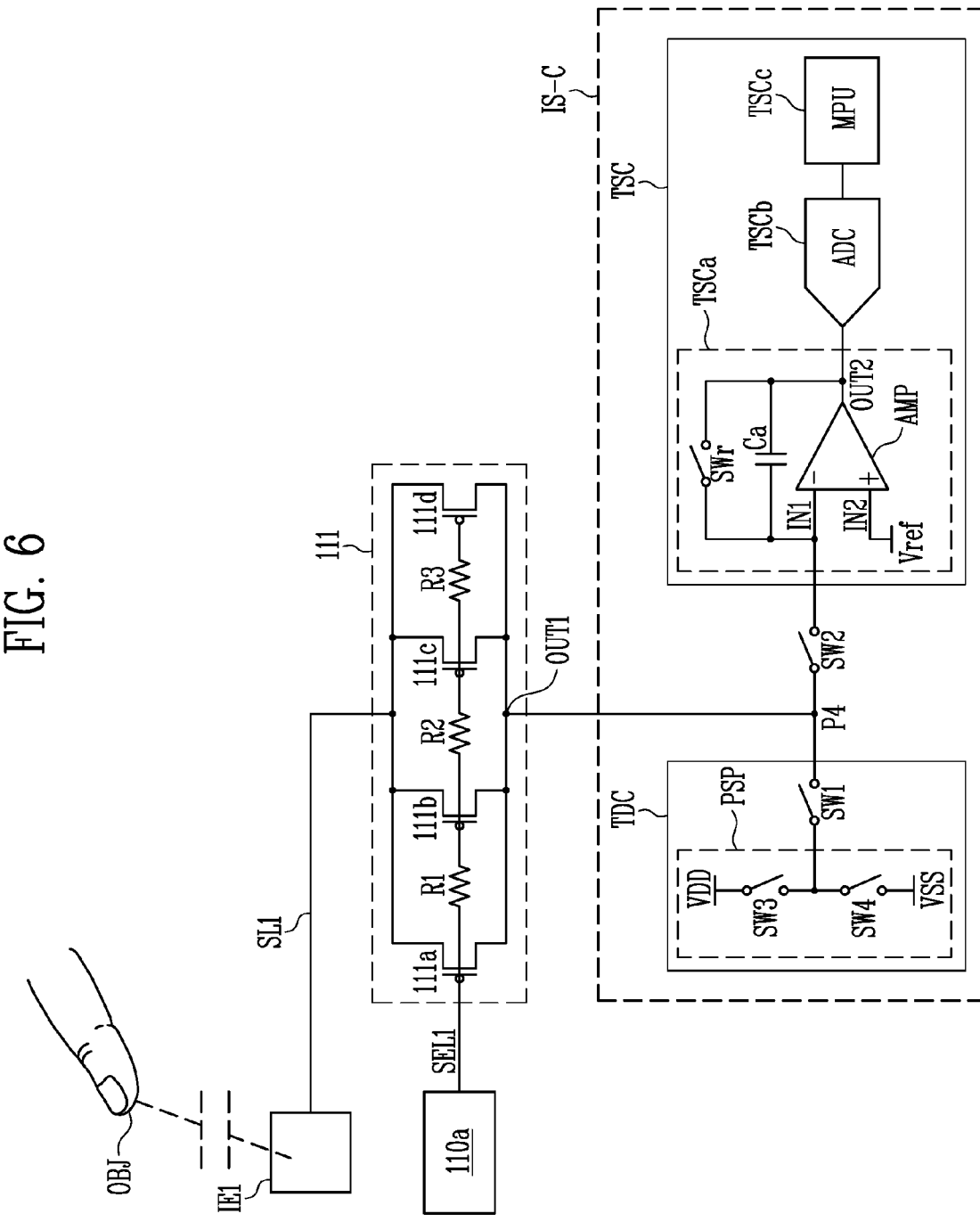
FIG. 6 is a diagram for describing a sensing electrode and an input sensing circuit according to an embodiment of the present invention.
Figure 7:
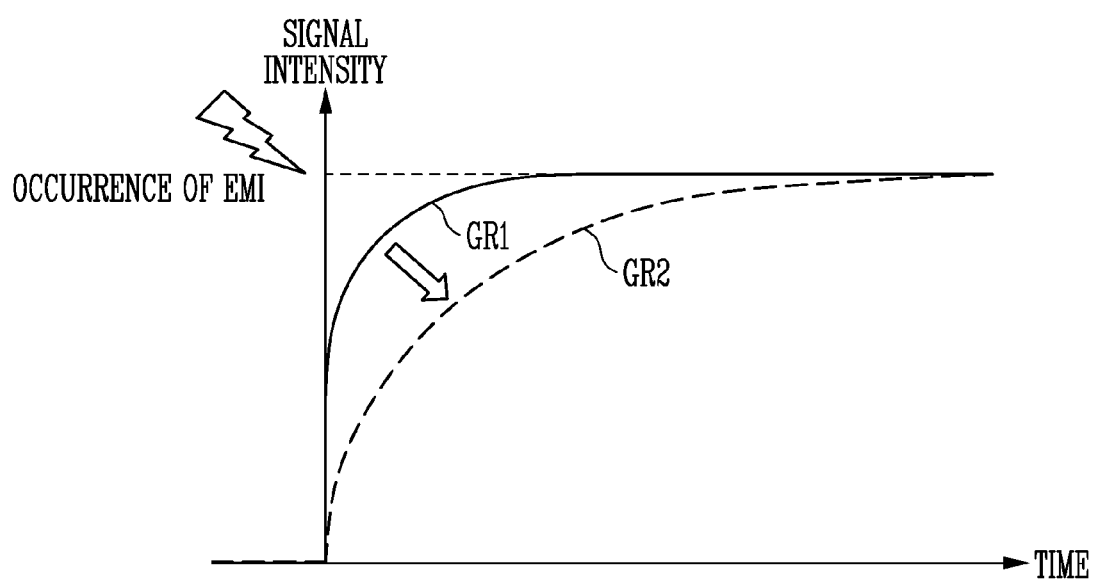
FIG. 7 is a diagram for describing a change in a slew rate of a signal transmitted when transistors are turned on/off.

FIG. 6 is a diagram for describing a sensing electrode and an input sensing circuit according to an embodiment of the present invention. FIG. 7 is a diagram for describing a change in a slew rate of a signal transmitted when transistors are turned on/off.

Referring to FIG. 6, the input sensing circuit IS-C according to an embodiment of the present invention may include a touch driver TDC (e.g., a driver circuit) and a touch receiver TSC (e.g., a receiver circuit). The following description will be given focusing on one sensing electrode IE1 and a signal line SL1. However, the same description may be applied to other sensing electrodes and signal lines of the input sensing unit ISU.

The touch driver TDC may include a first switch SW1 and a power supply PSP. The first switch SW1 may be connected to the output terminal OUT1 through the sensing pad P4. In other words, the first switch SW1 may be electrically connected to the signal line SL1. The power supply PSP may be configured to supply a charging signal VDD to the signal line SL1 during a first period in which the first switch SW1 is turned on.

The first switch SW1 may connect the power supply PSP to the signal line SL1. The power supply PSP may supply the charging signal VDD or an initialization signal VSS. The voltage level of the charging signal VDD may be different from the voltage level of the initialization signal VSS. For example, the voltage level of the charging signal VDD may be greater than the voltage level of the initialization signal VSS.

The power supply PSP may include a third switch SW3 and a fourth switch SW4 connected to the first switch SW1. For example, the power supply PSP may supply the charging signal VDD to the output terminal when the third switch SW3 is turned on, and may supply the initialization signal VSS to the output terminal when the fourth switch SW4 is turned on. The third switch SW3 may be turned off when the initialization signal VSS is supplied and the fourth switch SW4 may be turned off when the charging signal VDD is supplied.

The touch receiver TSC or the input sensing circuit IS-C may include a second switch SW2 and a touch channel TSCa. The second switch SW2 may be connected to the signal line SL1. That is, the first switch SW1 and the second switch SW2 may be connected to the same signal line SL1. The touch channel TSCa may be configured to receive the sensing signal from the signal line SL1 during a second period in which the second switch SW2 is turned on. In an embodiment, the second period is a period after the first period. In an embodiment, the first period and the second period do not overlap each other.

The touch channel TSCa may output a voltage signal having a voltage level corresponding to the amount of charges charged in the sensing electrode IE1 to the second output terminal OUT2. For example, the touch channel TSCa may be an integrator.

The touch channel TSCa may include an amplifier AMP, a sensing capacitor Ca, and a reset switch SWr. The amplifier AMP may include a first input terminal IN1 connected to the second switch SW2, a second input terminal IN2 receiving a reference voltage Vref, and a second output terminal OUT2. For example, the amplifier AMP may be an operational amplifier. The first input terminal IN1 may be an inverting terminal, and the second input terminal IN2 may be a non-inverting terminal. In an embodiment, the voltage level of the reference voltage Vref is greater than the voltage level of the initialization signal VSS and less than the voltage level of the charging signal VDD. The sensing capacitor Ca may connect the first input terminal IN1 to the second output terminal OUT2. The reset switch SWr may connect the first input terminal IN1 to the second output terminal OUT2.

In addition, the touch receiver TSC may further include an analog-to-digital converter TSCb and a processor TSCc. The analog-to-digital converter TSCb may receive the output signal of the touch channel TSCa. The analog-to-digital converter TSCb may convert the analog voltage level output from the touch channel TSCa into a digital value, and may output the digital value. The processor TSCc may receive the output signal of the analog-to-digital converter TSCb. The processor TSCc may determine the user's touch input by using the received digital value.

First, the first period for charging the sensing electrode IE1 will be described.

The power supply PSP may supply the charging signal VDD to the sensing electrode IE1 during the first period. For example, when the first switch SW1 and the third switch SW3 are turned on during the first period, the power supply PSP may supply the charging signal VDD to the sensing electrode IE1. During the first period, the second switch SW2 may be in a turned-off state.

In this case, the shift register array 110a may supply the first selection signal SEL1 to the switching transistor 111. The switching transistor 111 receiving the first selection signal SEL1 during the first period is turned on, and the sensing electrode IE1 may receive the charging signal VDD from the power supply PSP.

According to an embodiment of the present invention, the switching transistor 111 may be implemented with a plurality of sub-switching transistors 111a, 111b, 111c, and 111d. The sub-switching transistors 111a, 111b, 111c, and 111d may be disposed in parallel between the sensing electrode IE1 and the input sensing circuit IS-C (or the sensing node P4). A gate electrode of each of the sub-switching transistors 111a, 111b, 111c, and 111d may be commonly connected to the signal line through which the first selection signal SEL1 output from the shift register array 110a is transmitted.

The plurality of sub-switching transistors 111a, 111b, 111c, and 111d may be p-channel metal oxide semiconductor (PMOS) transistors. FIG. 6 illustrates a case in which the number of sub-switching transistors 111a, 111b, 111c, and 111d is four and all of the sub-switching transistors 111a, 111b, 111c, and 111d are PMOS transistors, but the present invention is not limited thereto. The number of sub-switching transistors 111a, 111b, 111c, and 111d may be variously changed, and the sub-switching transistors 111a, 111b, 111c, and 111d may be N-channel metal oxide semiconductor (NMOS) transistors.

Referring to FIG. 7, when the plurality of sub-switching transistors 111a, 111b, 111c, and 111d are simultaneously turned on, the slew rate of the charging signal VDD may rapidly increase, as shown in a first graph GR1 indicated by a solid line. The slew rate of the charging signal VDD may be defined as a rate at which the charging signal VDD tracks the first selection signal SEL1. In other words, the slew rate of the charging signal VDD may represent a change rate of the charging signal VDD with time.

When the slew rate of the charging signal VDD is rapidly increased, electromagnetic interference (EMI) may occur, which may cause vibration in the display panel DP or may affect communication.

In order to minimize EMI, a first resistor R1 may be disposed between the gate electrode of the first sub-switching transistor 111a and the gate electrode of the second sub-switching transistor 111b, a second resistor R2 may be disposed between the gate electrode of the second sub-switching transistor 111b and the gate electrode of the third sub-switching transistor 111c, and a third resistor R3 may be disposed between the gate electrode of the third sub-switching transistor 111c and the gate electrode of the fourth sub-switching transistor 111d.

When the first selection signal SEL1 is supplied from the shift register array 110a to the sub-switching transistors 111a, 111b, 111c, and 111d, the turn-on timings of the first sub-switching transistor 111a, the second sub-switching transistor 111b, the third sub-switching transistor 111c, and the fourth sub-switching transistor 111d may be different due to the first resistor R1, the second resistor R2, and the third resistor R3. For example, the first sub-switching transistor 111a, the second sub-switching transistor 111b, the third sub-switching transistor 111c, and the fourth sub-switching transistor 111d may be sequentially turned on. Due to this, as shown in a second graph GR2 indicated by a dashed line of FIG. 7, the slew rate of the charging signal VDD may decrease. When the slew rate of the charging signal VDD slowly increases, the probability of occurrence of EMI may be reduced.

According to an embodiment, the resistance value of the first resistor R1, the resistance value of the second resistor R2, and the resistance value of the third resistor R3 are substantially equal to each other. However, the present invention is not limited thereto. The resistance value of the first resistor R1, the resistance value of the second resistor R2, and the resistance value of the third resistor R3 may increase in this order. For example, in one embodiment, the resistance value of the third resistor R3 is higher than the resistance value of the second resistor R2, and the resistance value of the second resistor R2 is higher than the resistance value of the first resistor R1. Conversely, the resistance value of the first resistor R1, the resistance value of the second resistor R2, and the resistance value of the third resistor R3 may decrease in this order. For example, in one embodiment, the resistance value of the second resistor R2 is lower than the resistance value of the first resistor R1, and the resistance value of the third resistor R3 is lower than the resistance value of the second resistor R2.

Next, the second period for sensing the sensing electrode IE1 will be described.

The second switch SW2 may electrically connect the touch channel TSCa to the sensing electrode IE1 during the second period after the first period. That is, the second switch SW2 may be in a turned-on state during the second period. During the second period, the first switch SW1 may be in a turned-off state.

The touch channel TSCa may receive the sensing signal from the sensing electrode IE1 during the second period. For example, the touch channel TSCa may output a voltage signal corresponding to the amount of charges charged in the sensing electrode IE1 to the second output terminal OUT2. The amount of charges charged in the sensing electrode IE1 may be changed when a touch input is generated by a user's finger OM at or around the corresponding point.

In this case, the shift register array 110a may supply the first selection signal SEL1 to the switching transistor 111. When the first selection signal SEL1 is supplied from the shift register array 110a to the sub-switching transistors 111a, 111b, 111c, and 111d during the second period, the first sub-switching transistor 111a, the second sub-switching transistor 111b, the third sub-switching transistor 111c, and the fourth sub-switching transistor 111d may be sequentially turned on due to the first resistor R1, the second resistor R2, and the third resistor R3. Therefore, as shown in the second graph GR2 indicated by the dashed line of FIG. 7, the slew rate of the sensing signal may decrease, compared with the first graph GR1. When the slew rate of the sensing signal slowly increases, the probability of occurrence of EMI may be reduced. The slew rate of the sensing signal may be defined as a rate at which the sensing signal tracks the first selection signal SEL1. In other words, the slew rate of the sensing signal may represent the change rate of the sensing signal with time.

The analog-to-digital converter TSCb may convert the voltage signal received from the touch channel TSCa into a digital value, and the processor TSCc may determine a user's touch input by using the received digital value.

Next, a third period for initializing the sensing electrode IE1 will be described.

The first switch SW1 may electrically connect the power supply PSP to the sensing electrode IE1 during the third period after the second period. That is, the first switch SW1 may be in a turned-on state during the third period, and the second switch SW2 may be in a turned-off state during the third period.

The power supply PSP may supply the initialization signal VSS to the sensing electrode IE1 through the signal line SL1 during the third period. For example, when the fourth switch SW4 is turned on during the third period, the power supply PSP may supply the initialization signal VSS to the sensing electrode IE1.

In this case, the shift register array 110a may supply the first selection signal SEL1 to the switching transistor 111. When the first selection signal SEL1 is supplied from the shift register array 110a to the sub-switching transistors 111a, 111b, 111c, and 111d during the third period, the first sub-switching transistor 111a, the second sub-switching transistor 111b, the third sub-switching transistor 111c, and the fourth sub-switching transistor 111d may be sequentially turned on due to the first resistor R1, the second resistor R2, and the third resistor R3. Therefore, as shown in the second graph GR2 indicated by the dashed line of FIG. 7, the slew rate of the initialization signal VSS may decrease, compared with the first graph GR1. When the slew rate of the initialization signal VSS slowly increases, the probability of occurrence of EMI may be reduced. The slew rate of the initialization signal VSS may be defined as a rate at which the initialization signal VSS tracks the first selection signal SEL1. In other words, the slew rate of the initialization signal VSS may represent a change rate of the initialization signal VSS with time.

At the end of the third period, the voltage level of the sensing electrode IE1 may be equal to the voltage level of the initialization signal VSS.

In some embodiments, the amount of charges in the sensing capacitor Ca may be initialized by turning on the reset switch SWr during the third period.

Figure 8A:
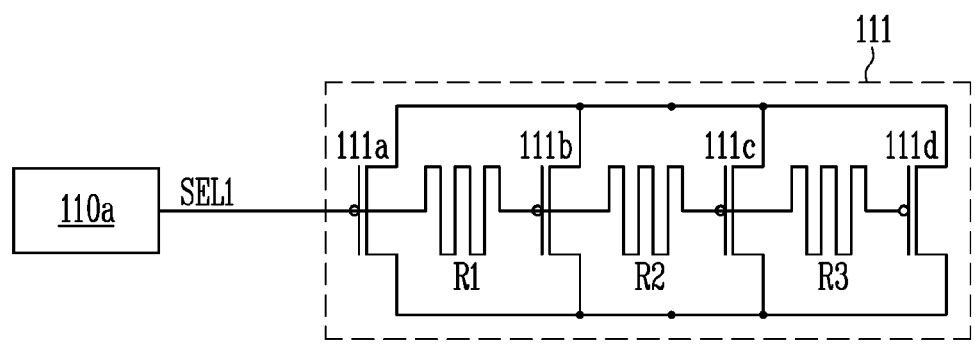
FIGS. 8A and 8B are diagrams for describing a method of implementing first to third resistors of FIG. 6.
Figure 8B:
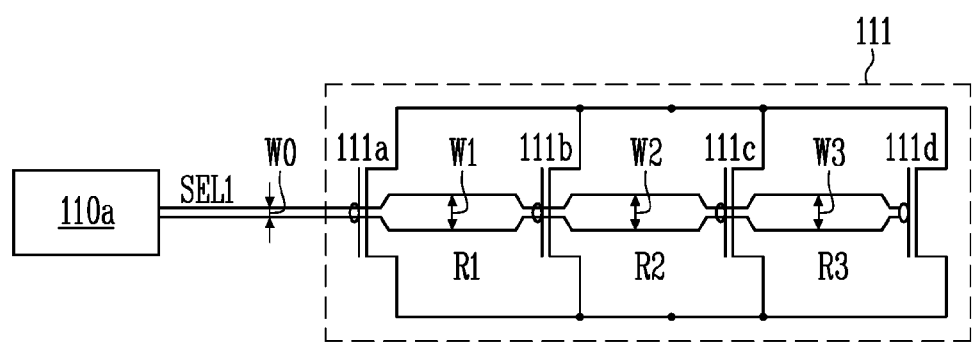

FIGS. 8A and 8B are diagrams for describing a method of implementing the first to third resistors of FIG. 6. In this case, the gate electrode of each of the sub-switching transistors 111a, 111b, 111c, and 111d may be commonly connected to the signal line through which the first selection signal SEL1 of the shift register array 110a is output.

Referring to FIG. 8A, a first bent portion having a zigzag shape may be included in one region of a wiring connecting the gate electrode of the first sub-switching transistor 111a to the gate electrode of the second sub-switching transistor 111b. The actual distance of the wiring measured along the zigzag shape of the first curved portion may be longer than the shortest distance of the wiring connecting the start point of the first curved portion to the end point of the first curved portion. That is, when the first bent portion is included between the gate electrode of the first sub-switching transistor 111a and the gate electrode of the second sub-switching transistor 111b, the magnitude of the wiring resistor (that is, the first resistor R1) may be greater than the magnitude of the wiring resistor when the first bent portion is not included. For example, the resistance of the first resistor R1 may be higher when the first bent portion is included.

Similarly, a second bent portion having a zigzag shape may be included in one region of a wiring connecting the gate electrode of the second sub-switching transistor 111b to the gate electrode of the third sub-switching transistor 111c. That is, when the second bent portion is included between the gate electrode of the second sub-switching transistor 111b and the gate electrode of the third sub-switching transistor 111c, the magnitude of the wiring resistor (that is, the second resistor R2) may be greater than the magnitude of the wiring resistor when the second bent portion is not included. For example, the resistance of the second resistor R2 may be higher when the second bent portion is included.

In addition, a third bent portion having a zigzag shape may be included in one region of a wiring connecting the gate electrode of the third sub-switching transistor 111c to the gate electrode of the fourth sub-switching transistor 111d. That is, when the third bent portion is included between the gate electrode of the third sub-switching transistor 111c and the gate electrode of the fourth sub-switching transistor 111d, the magnitude of the wiring resistor (that is, the third resistor R3) may be greater than the magnitude of the wiring resistor when the third bent portion is not included. For example, the resistance of the first resistor R3 may be higher when the third bent portion is included.

At this time, the actual distance of the wiring measured along the zigzag shape of the first bent portion, the actual distance of the wiring measured along the zigzag shape of the second bent portion, and the actual distance of the wiring measured along the zigzag shape of the third bent portion may be substantially equal to each other. However, this is only an example, and the actual distance of the wiring measured along the zigzag shape of the first bent portion, the actual distance of the wiring measured along the zigzag shape of the second bent portion, and the actual distance of the wiring measured along the zigzag shape of the third bent portion may increase or decrease in this order. The resistance may increase as the actual distance of the wiring measured along the zigzag shape of the bent portion increases. In contrast, the resistance may decrease as the actual distance of the wiring measured along the zigzag shape of the bent portion decreases.

Referring to FIG. 8B, a wire connecting the gate electrode of the first sub-switching transistor 111a to the gate electrode of the second sub-switching transistor 111b may have a first width W1. The first width W1 may be greater than a zeroth width W0 (or the reference width of the wiring) that is the width of the wiring connecting the shift register array 110a to the gate electrode of the first sub-switching transistor 111a. That is, the magnitude of the wiring resistor (that is, the first resistor R1) having the first width W1 may be less than the magnitude of the wiring resistor having the reference width (that is, the zeroth width W0). For example, the magnitude of the resistance of the resistor R1 having the first width W1 may be less than the magnitude of the resistance of the wiring resistor having the reference width.

Similarly, a wiring connecting the gate electrode of the second sub-switching transistor 111b to the gate electrode of the third sub-switching transistor 111c may have a second width W2. The second width W2 may be greater than the zeroth width W0 (or the reference width of the wiring). That is, the magnitude of the wiring resistor (that is, the second resistor R2) having the first width W2 may be less than the magnitude of a wiring resistor having the reference width (that is, the zeroth width W0).

In addition, a wiring connecting the gate electrode of the third sub-switching transistor 111c to the gate electrode of the fourth sub-switching transistor 111d may have a third width W3. The third width W3 may be greater than the zeroth width W0 (or the reference width of the wiring). That is, the magnitude of the wiring resistor (that is, the third resistor R3) having the third width W3 may be less than the magnitude of the wiring resistor having the reference width (that is, the zeroth width W0).

In this case, the magnitudes of the first width W1, the second width W2, and the third width W3 may be substantially equal to each other. However, the present invention is not limited thereto, and the first width W1, the second width W2, and the third width W3 may increase or decrease in this order. The magnitude of the resistor may decrease as the width of the wiring increases, and the magnitude of the resistor may increase as the width of the wiring decreases. For example, the magnitude of the resistance of the resistor may decrease as the width of the wiring increases, and the magnitude of the resistance of the resistor may increase as the width of the wiring decreases.

In the display device according to an embodiment of the present invention, the resistive element capable of controlling the slew rate of the touch sensing signal is provided in the multiplexer structure. Therefore, upon touch driving, electromagnetic interference may be reduced, and the size and production cost of the touch driver (or the touch IC) may be reduced.

Although the present invention has been described with reference to the embodiments, it will be understood by those skilled in the art that various modifications and changes can be made thereto without departing from the spirit and scope of the present invention as set forth in the appended claims.

What is claimed is:

1. An input sensor comprising:
   a plurality of sensing electrodes; and
   a plurality of multiplexers, where each multiplexer connects one group of the sensing electrodes to one output terminal,
   wherein each of the multiplexers comprises:
   a multiplexer circuit including a plurality of switching transistors; and
   a shift register array for outputting selection signals for controlling the plurality of switching transistors, wherein each of the switching transistors includes a plurality of sub-switching transistors connected in parallel between one of the sensing electrodes corresponding to the one group and the output terminal,
   wherein for each multiplexer circuit, sub-switching transistors are sequentially turned on in response to sequential selection signals from a corresponding shift register array.

2. The input sensor of claim 1, wherein gate electrodes of the sub-switching transistors are commonly connected to a wiring through which the one selection signal output from the shift register array is transmitted.

3. The input sensor of claim 2, wherein the wiring includes a resistor between the gate electrodes of the sub-switching transistors.

4. The input sensor of claim 2, wherein the wiring includes a bent portion having a zigzag shape between the gate electrodes of the sub-switching transistors.

5. The input sensor of claim 2, wherein the wiring has a width greater than a reference width between the gate electrodes of the sub-switching transistors.

6. The input sensor of claim 5, wherein the reference width corresponds to the width of the wiring between the shift register array and the sub-switching transistor to which the one selection signal is first supplied.

7. Input sensor of claim 2, further comprising: a touch driver including a power supply for supplying a charging signal or an initialization signal to the sensing electrodes and a first switch for connecting the power supply to the output terminal; and an input sensing circuit including a touch receiver having a second switch connected to the output terminal and receiving a sensing signal from the sensing electrodes.

8. The input sensor of claim 7, wherein the input sensing circuit is connected to each of the multiplexers through a sensing pad.

9. The input sensor of claim 7, wherein the power supply includes a third switch disposed between the first switch and a terminal for supplying the charging signal, and a fourth switch disposed between the first switch and a terminal for supplying the initialization signal.

10. The input sensor of claim 9, wherein the input sensing circuit is configured so that, during a first period in which the charging signal is supplied to the sensing electrodes, the first switch and the third switch are turned on and the second switch and the fourth switch are turned off.

11. The input sensor of claim 10, wherein the input sensing circuit is configured so that, during a second period in which the sensing signal is received from the sensing electrodes, the second switch is turned on and the first switch is turned off.

12. The input sensor of claim 11, wherein the input sensing circuit is configured so that, during a third period in which the initialization signal is supplied to the sensing electrodes, the first switch and the fourth switch are turned on and the second switch and the third switch are turned off.

13. The input sensor of claim 7, wherein the touch receiver comprises:
a touch channel, connected to one end of the second switch, for receiving the sensing signal and outputting an output signal having an analog voltage level to a second output terminal;
an analog-to-digital converter, connected to the second output terminal, for converting the output signal into a digital value and outputting the digital value; and
a processor, connected to the analog-to-digital converter, for determining a touch input by using the digital value.

14. The input sensor of claim 13, wherein the touch channel comprises: an amplifier including a first input terminal connected to the second switch, a second input terminal for receiving a reference voltage, and the second output terminal; a sensing capacitor connected between the first input terminal and the second output terminal; and a reset switch connected between the first input terminal and the second output terminal.

15. The input sensor of claim 14, wherein the reset switch is turned on while the initialization signal is supplied to the sensing electrodes.

16. A display device comprising:
a display panel in which a base layer, a circuit element layer, a display element layer, and a thin film encapsulation layer (TFE) are sequentially stacked; and
an input sensor disposed on the thin film encapsulation layer, wherein the input sensor comprises:
a plurality of sensing electrodes; and
a plurality of multiplexers, where each multiplexer connects one group of the sensing electrodes to one output terminal,
wherein each of the multiplexers comprises:
a multiplexer circuit including a plurality of switching transistors; and
a shift register array for outputting selection signals for controlling the plurality of switching transistors,
wherein each of the switching transistors includes sub-switching transistors connected in parallel between one of the sensing electrodes corresponding to the one group and the output terminal,
wherein for each multiplexer circuit, sub-switching transistors are sequentially turned on in response to sequential selection signals from a corresponding shift register array.

17. The display device of claim 16, wherein gate electrodes of the sub-switching transistors are commonly connected to a wiring through which the one selection signal output from the shift register array is transmitted.

18. The display device of claim 17, wherein the wiring includes a resistor between the gate electrodes of the sub-switching transistors.

19. The display device of claim 17, wherein the wiring includes a bent portion having a zigzag shape between the gate electrodes of the sub-switching transistors.

20. The display device of claim 17, wherein the wiring has a width greater than a reference width between the gate electrodes of the sub-switching transistors, and the reference width corresponds to the width of the wiring between the shift register array and the sub-switching transistor to which the one selection signal is first supplied.

* * * * *